United States Patent [19]

Hilterhaus et al.

[11] 4,108,954

[45] Aug. 22, 1978

[54] PROCESS OF PRODUCING SHAPED STRUCTURES OF CROSSLINKED ELASTOMERIC POLYURETHANE

[75] Inventors: Karl Heinz Hilterhaus, Georgsmarienhütte, Oesede; Franz Gottfried Reuter, Lemförde, both of Germany

[73] Assignees: Chemie-Anlagenbau Bischofsheim GmbH, Osnabruck; Reuter Technologie GmbH, Lemförde, both of Germany

[21] Appl. No.: 630,491

[22] Filed: Nov. 10, 1975

[30] Foreign Application Priority Data

Dec. 18, 1974 [DE] Fed. Rep. of Germany ....... 2459757

[51] Int. Cl.$^2$ .................. B29D 7/02; C08G 18/08; C08G 18/32
[52] U.S. Cl. .................. 264/216; 260/30.4 N; 260/30.8 DS; 260/31.2 N; 260/31.4 R; 260/31.8 R; 260/32.6 NR; 260/32.8 N; 260/33.2 R; 260/33.6 UB; 260/33.8 UB; 260/34.2; 264/331
[58] Field of Search ... 260/2.5 AY, 75 NE, 77.5 AA; 264/216, 331

[56] References Cited

U.S. PATENT DOCUMENTS

| | | | |
|---|---|---|---|
| 3,190,766 | 6/1965 | Yuan | 260/2.5 AY |
| 3,415,790 | 12/1968 | Davis | 260/75 NE |
| 3,483,167 | 12/1969 | Sommer et al. | 260/75 NE |
| 3,491,053 | 1/1970 | Sommer et al. | 260/2.5 AY |
| 3,565,982 | 2/1971 | Day | 260/2.5 AY |
| 3,595,732 | 7/1971 | Tingerthal | 260/2.5 AY |
| 3,860,440 | 1/1975 | Nakajo | 260/2.5 AY |

*Primary Examiner*—H.S. Cockeram
*Attorney, Agent, or Firm*—Carson, Taylor and Hinds

[57] ABSTRACT

This invention relates to a process for producing crosslinked elastomeric shaped polyurethane structures from crosslinked polyurethanes dissolved in solvents produced by the combination of the following steps:

1. preparation of an NCO pre-adduct in a non-critical NCO/OH proportion from a treated polyol and the corresponding diisocyanate in a highly polar solvent;
2. preparation of a solution containing crosslinked polyurethanes by introducing into the polymerization vessel a chain propagating and/or chain crosslinking agent and/or a combination thereof, and stirring into said vessel the NCO pre-adduct solution from step 1 such that the viscosity becomes an indication of the degree of the instantaneously occurring chain propagation and chain crosslinking reactions. In this way a solution is obtained which is at the borderline state between solution and gel and in which highly crosslinked polymer portions are uniformly distributed;
3. molding;
4. removal of the solvent by evaporation.

19 Claims, No Drawings

PROCESS OF PRODUCING SHAPED STRUCTURES OF CROSSLINKED ELASTOMERIC POLYURETHANE

The invention relates to a process for producing shaped structures of crosslinked elastomeric polyurethane from crosslinked polyurethanes dissolved in solvents.

In order to produce crosslinked shaped polyurethane structures a wide variety of methods have been known. Thus, for instance, a pretreated polyol is first reacted in the melt either discontinuously or continuously with a precisely metered amount of diisocyanate to obtain a solid pre-adduct containing isocyanate groups. Said adduct is then comminuted, dissolved in a solvent and treated with suitable chain propagating and/or crosslinking agents. Within a specific "pot life" the composition is solidified while being shaped. In this method which requires a high investment of power quite a number of process steps must be carried out which pose a number of technological problems, until the final product is obtained.

Thus, the precise metering of the OH components with respect to the NCO components meets with difficulties because a proportion just below or above 1:1 must be maintained. However, from the Carothers equation it may be seen that the metering and the reaction parameters are especially critical within this range. Therefore, in discontinuous operation it frequently happens that various batches having excessively high and excessively low viscosity must be blended. Of course, this brings about a considerable levelling of the Gauss distribution curve, which is characteristic of a non-homogeneous material.

On the other hand, during continuous operation it normally can be detected only after days whether or not a suitable material has been obtained. It may easily happen that large amounts of useless adduct are prepared. In order to avoid this as far as possible, sophisticated and expensive techniques must be employed. Minutest changes occurring at the metering pump already result in wide variations in quality.

Furthermore, in said known method it is necessary to entertain a large pool of production equipment, since annealing in ovens, comminution and possibly freezing, and the time-consuming dissolution of the adduct call for considerable investment.

Therefore, it is an object of the present invention to provide a process which does not have the shortcomings indicated above and which permits precise metering and savings in power without major investments. Moreover, it is an object of the invention to design the process such that it ensures the formation of largely reproducible final products.

These objects are attained by the combination of the following steps:

1. preparation of an NCO pre-adduct in a non-critical NCO/OH proportion from a treated polyol and the corresponding diisocyanate in a highly polar solvent;
2. preparation of a solution containing crosslinked polyurethanes by introducing into the polymerization vessel a chain propagating and/or chain crosslinking agent and/or a combination thereof, and stirring into said vessel the NCO-pre-adduct solution from step 1 such that the viscosity becomes an indication of the degree of the instantaneously occurring chain propagation and chain crosslinking reactions. In this way a solution is obtained which is at the borderline state between solution and gel and in which highly crosslinked polymer portions are uniformly distributed;
3. removal of the solvent by evaporation.

In this way a polyurethane elastomer is obtained which has such a high degree of crosslinkage that it is no longer completely soluble in the former solvent.

By the novel process it is possible to produce elastomeric shaped articles from polyurethane precursor products obtainable everywhere, without the need of expensive equipment.

Since only relatively short reaction periods and low reaction temperatures are required, the exothermic heat of reaction is fully utilized. Thus, for instance, annealing in an oven is unnecessary. The saving in power amounts to about 50%.

Further technical advantages may be seen from the following comparison:

| Mode of Operation | |
|---|---|
| Conventional | Novel |
| 1. melting the polyol | melting the polyol |
| 2. rectifying the polyol | rectifying the polyol |
| 3. — | stabilizing the polyol |
| 4. heating the isocyanate (about 90° C.) | heating the isocyanate to 40° C. |
| 5. — | dissolving the isocyanate |
| 6. precisely metering the components by special pumps +) | metering by flow gauge |
| 7. exothermic heat $R_x$ at >100° C. | exothermic heat $R_x$ at <75° C. |
| 8. casting into moulds and annealing at about 120° C. +) | — |
| 9. storing | storing |
| 10. treating with talcum | — |
| 11. deep freezing | — |
| 12. comminuting +) | — |
| 13. dissolving | — |
| 14. adjusting the viscosity +) | — |
| 15. crosslinking | optionally additional crosslinking reaction |
| 16. shaping | shaping |
| 17. evaporating the solvent | evaporating the solvent |

+) expecially critical or expensive process steps

Hence, the subject matter of the invention is a process for producing crosslinked elastomeric shaped polyurethane structures from polyurethanes dissolved in solvents which is characterized in that (a) in a manner known per se an NCO pre-adduct is prepared, and said pre-adduct is dissolved in a suitable solvent, or the NCO pre-adduct is directly prepared in a solvent, then (b) to a previously prepared solution of a suitable solvent and hydrazine and/or the hydrazine derivatives and/or diamines and/or polyols, with the proviso that, if said compounds contain only two hydrogen atoms active according to Zerewitinov, a compound must be additionally used which contains at least three hydrogen atoms differently active according to Zerewitinov, so much of the NCO pre-adduct solution is continuously admixed over a specific period of time during which the viscosity is constantly measured, until the viscosity is within a range in which the addition of lesser and lesser quantities of NCO pre-adduct solution causes an ever growing increase in viscosity, until finally the viscosity has reached a level — and then the addition of NCO pre-adduct solution must be discontinued at the latest — at which the addition of even the minutest amount of NCO pre-adduct solution would result in instantaneous gelling, the addition of the NCO pre-adduct solution being effected at a rate such that the so-called "final solution" has a solids content between 15 and 35% by weight, and (c) the "final solution" prepared in this way is brought into the desired form without, prior to, or after gelling, and during or after shaping, the solvent is evaporated without being allowed to come to a boil.

The NCO pre-adducts used according to the invention are higher molecular weight compounds with two terminal NCO groups, which preferably possess a molecular weight of 100 to 10,000, especially between 800 and 2,5000. Preferably the NCO pre-adducts have a content of NCO groups of 1.5 to 5%. The preparation of these NCO pre-adducts is carried out in a known manner by reacting higher molecular weight compounds containing OH groups with an excess of polyisocyanate. The preparation of such NCO pre-adducts is described, for example, in Angewandte Chemie 64, 523 to 531 (1952); Kunststoffe 42, 303 to 310 (1952); German Patent No. 831,772; German Patent No. 897,014; German Patent No. 929,507; and U.S. Pat. No. 3,000,757. Preferably the formation of the NCO pre-adduct is controlled such that linear NCO pre-adducts having a narrow molecular weight distribution are obtained. The question of which NCO pre-adducts to use in the individual case depends on the individual systems, because the reactivity of the NCO pre-adduct relative to the chain propagation and/or crosslinking agent largely determines the relationship between linear molecular weight and the degree of crosslinkage.

Higher molecular weight compounds containing OH groups which are suitable for the production of the NCO pre-adducts are, for example, polyesters, polyethers, polyesteramides, polythioethers and polyacetals.

As polyols for the preparation of the NCO pre-adducts one may use, for example, linear hydroxylpolyesters which contain primary and/or secondary and/or tertiary hydroxyl groups and which have been obtained either by polycondensation of $\epsilon$-caprolactone or 6-hydroxycaproic acid or by copolymerisation of $\epsilon$-caprolactone with dihydric alcohols or by polycondensation of dicarboxylic acids with dihydric alcohols.

The hydroxylpolyesters used for the production of the NCO pre-adducts can also be produced from dicarboxylic acids or mixtures of dicarboxylic acids and dihydric alcohols. Suitable dicarboxylic acids include, for example, adipic acid, succinic acid, suberic acid, sebacic acid, oxalic acid, methyladipic acid, glutaric acid, pimelic acid, azelaic acid, phthalic acid, terephthalic acid, isophthalic acid, maleic acid, fumeric acid, citraconic acid, itaconic acid. Suitable dihydric alcohols or mixtures thereof which are reacted with the dicarboxylic acids or -caprolactone to form the desired hydroxypolyesters include, for example, ethylene glycol, propylene glycol, butylene glycols, for example 1,4-butanediol; butenediol, butindiol, bis-(hydroxymethyl-cyclohexane), diethylene glycol, 2,2-dimethylpropylene glycol, 1,3-propylene glycol. However, the above mentioned diols may also be used all by themselves. This also applies to diamines or other low molecular weight compounds containing two hydrogen atoms with Zerewitinov activity.

Suitable polyalkylene ethers possessing primary and/or secondary and/or tertiary hydroxyl groups which can be used according to the invention are obtained by reacting an alkylene oxide with a small quantity of a compound containing active hydrogen, such as water, ethylene glycol, propylene glycol, amylene glycol. It is also possible to use alkylene oxide condensates of ethylene oxide, propylene oxide, butylene oxide, amylene oxide, styrene oxide and mixtures thereof. It is also possible to use the polyalkylene ethers which can be produced from tetrahydrofuran.

According to the invention every suitable polyester amide can be used for the preparation of the NCO pre-adducts, for example the reaction product of an amine and/or aminoalcohol with a dicarboxylic acid. Suitable amines are, for example, ethylenediamine, propylenediamine; suitable amines are, for example, ethylenediamine, propylenediamine; suitable aminoalcohols are, for example, 1-hydroxy-2-amino-ethylene. Any suitable polycarboxylic acid can be used, for example those which have already been mentioned for the production of the hydroxypolyesters. Furthermore it is possible to use a mixture of a glycol and of an aminoalcohol or polyamine. Each of the glycols already mentioned for the production of the hydroxypolyesters can also be used for the production of the hydroxypolyester amides.

According to the invention it is also possible to use for the preparation of the NCO pre-adducts those polyols which can be referred to as polyetherester polyols, in which there occur alternating ester bonds and ether bonds. These polyetherester polyols are described in Canadian Patent No. 783,646.

Polyols preferably used for the preparation of the NCO pre-adducts include polyesters on the basis of adipic acid, 1,6-hexanediol and neopentyl glycol with an average molecular weight of approximately 2,000 (Polyol 2,002 manufactured by Polyol Chemie of Osnabruck, hydroxyl number 56, acid number 1), polyesters on a polycaprolactone basis with an average molecular weight of 2,000 (Niax Polyol D 560 manufactured by Union Carbide Corporation) and polyethers with the trade name "Polyol PTMG" of BASF with an average molecular weight of 2,000.

Furthermore, higher molecular weight compounds with terminal carboxyl, amino and mercapto groups are suitable. Polysiloxanes which have groups which are reactive with isocyanates should also be mentioned. Further utilisable compounds are described, for example, in J. H. Saunders, K. C. Frisch "Polyurethanes" Part 1, New York, 1962, pages 33 to 61 and in the literature cited here.

For the preparation of the NOC pre-adducts it is possible to use any suitable organic diisocyanate, for example aliphatic diisocyanates, aromatic diisocyanates, alicyclic diisocyanates and heterocyclic diisocyanates, for example methylene diisocyanate, ethylene diisocyanate, propylene diisocyanate, butylene diisocyanate, cyclohexylene 1,4-diisocyanate, cyclohexylene 1,2-diisocyanate, tetra- or hexamethylene diisocyanate, arylene diisocyanates or their alkylation products, such as phenylene diisocyanates, naphthylene diisocyanates, diphenylmethane diisocyanates, toluylene diisocyanates, di- or triisopropylbenzene diisocyanates; aralkyl diisocyanates such as xylylene diisocyanates, fluoro-substituted isocyanates, ethyleneglycol diphenylether-2,2'-diisocyanate, naphthalene-1,4-diisocyanate, naphthalene-1,1'-diisocyanate, biphenyl-2,4'-diisocyanate, biphenyl-4,4'-diisocyanate, benzophenone-3,3-diisocyanate, fluorene-2,7-diisocyanate, anthraquinone-2,6-diisocyanate, pyrene-3,8-diisocyanate, chrysene-2,8-diisocyanate, 3'-methoxyhexane diisocyanate, octane diisocyanate, $\omega,\omega'$-diisocyanate-1,4-diethylbenzene,$\omega,\omega'$-diisocyanate-1,4-dimethylnaphthalene, cyclohexane-1,3-diisocyanate, 1-isopropylbenzene-2,4- diisocyanate, 1-chlorobenzene-2,4-diisocyanate, 1-fluorobenzene-2,4-diisocyanate, 1-nitrobenzene-2,4-diisocyanate, 1-chloro-4-methoxybenzene-2,5-diisocyanate, benzene-azonaphthalene-4,4'-diisocyanate, diphenylether-2,4-diisocyanate, diphenylether-4,4-diisocyanate, as well as oliisocyanates containing isocyanurate groups.

Diisocyanates which are preferably used according to the invention are: 4,4'-diphenylmethane diisocyanate and/or its 2,4- and/or its 2,2'-isomers, 1,6-hexamethylene diisocyanate, 2,4-toluylene and/or 2,5-toluylene diisocyanate and m-xylylene diisocyanate.

The chain propagating/crosslinking agents are preferably substances containing highly active hydrogen atoms of different activity, as present, for instance, in the $NH_2$ group of hydrazines. The use of hydrazine compounds, especially of hydrazine itself, is therefore preferred. Preferably the chain propagation takes place such that about 60% of said $NH_2$ groups are used for chain extension and the remaining 40% for chain crosslinkage. The reaction must take place spontaneously so that addition of pre-adduct and rise in viscosity occur in proportion. Systems with chain propagating/crosslinking mixtures of lesser activity (than hydrazine, for instance) must be catalyzed such that the 60 to 40% relation is maintained, to thereby utilize in an especially favorable way the principles of the Flory equation which determines the degree of polymerization in a solvent with the number of crosslinkage sites.

In this connection it is pointed out that according to Saunders and Frisch in "Polyurethanes: Chemistry and Technology, II. Technology, page 319, the preparation of polyurethane elastomers is especially difficult if diamines are used as chain propagating agents, since they easily lead to non-homogeneous products on account of their high reactivity. However, the invention makes use of this very circumstance in order to obtain uniform products. Thus, the high reactivity of hydrazine is deliberately utilized to achieve chain propagation and a self-controlling degree of crosslinkage such that this takes place in solution and the final solution remains castable for at least 24 hours when properly stored.

In order to achieve additional crosslinkage, the crosslinking reactions familiar in the polyurethane chemistry may be utilized. Moreover, formaldehyde in polymeric form may be added to the crosslinking agent solution. When formaldehyde in dimethylformamide and hydrazine hydrate are introduced first into the reactor, the first step of a Wolff-Kishner reaction is initiated in which the hydrazone is formed besides water. However, under the selected reaction conditions isocyanate-water reaction is largely suppressed and the following crosslinking reaction is promoted:

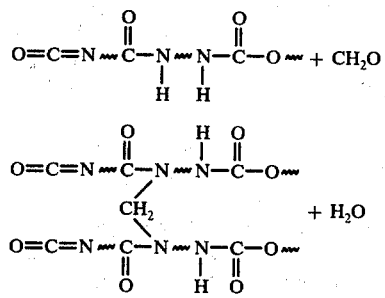

The amount of added aldehyde depends on the later use of the product. The upper limit is the stoichiometrical point, based on NH groups of the elastomer. However, this crosslinkage is different, since it takes place later at elevated temperatures such as those occuring during the removal of the solvent.

Additional crosslinkage is also achieved when unsaturated systems are employed, and these double bonds are broken up by electron bombardment thereby initiating localized branching reactions.

As mentioned before, suitable substances for the purposes of the invention are particularly hydrazine compounds such as hydrazine hydrate, carbohydrazide, carbodihydrazide, semicarbazide, carbazone, oxalic acid dihydrazide, terephthalic acid dihydrazide and dihydrazides of longer chain dicarboxylic acids and also dihydrazine compounds of the general formula $$H_2N-NH-X-NH-NH_2,$$

in which X signifies Co, CS, P(O)OR, P(O)NR$_2$, BOR or SiO$_2$, in which R stands for an aliphatic or aromatic radical, as well as compounds which have the piperazine structure

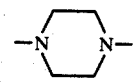

and two or more terminal amino groups.

Preferably the radicals R represent alkyl or aryl radicals. Of course, in the process according to the invention one can also use the corresponding hydrate forms, which is even preferred in the case of hydrazine in view of the lesser handling hazard.

By the polyaddition of the above-described NCO prepolymers with hydrazine or dihydrazine compounds one obtains, for example, polycarbohydrazides or polycarbodihydrazides or mixtures thereof with recurring units partially crosslinked via the "—NH—" and "—NH—NH—" groups.

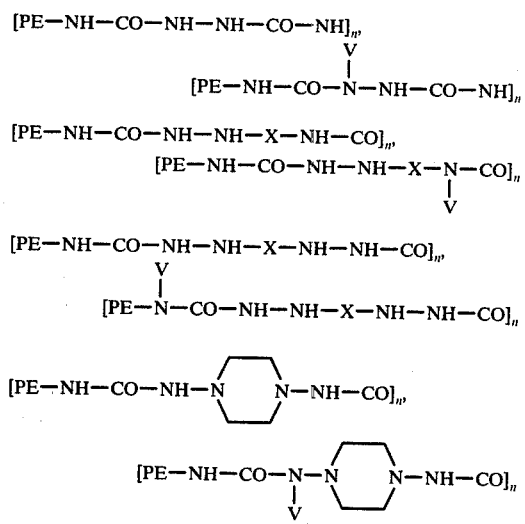

wherein "V" represents a possible and controlled site of linkage with an adjacent polymer chain.

In these formulae the abbreviation PE signifies polyester, polyether, polyamides, polythioether, polyacetals; X signifies a carbonyl, thiocarbonyl, sulpho, SiO$_2$, BOR, P(O)OT or P(O)NH$_2$ group; R stands for an aliphatic or aromatic radical; and n signifies that the final polyurethane contains plurality or multiplicity of the units mentioned before.

Suitable diamines which can be used according to the present invention include, for example, ethylenediamine, propylenediamine, toluylenediamine, xylylenediamine, piperazine or piperazine hexahydrate as well as 1,4-diaminopiperazine.

As already mentioned, according to the invention one uses the hydrazines, dihydrazine compounds and/or diamines preferably either in a deficient quantity or in excess. When one uses a deficient quantity one adds to the prepared component solution further substances which contain at least two groups possessing active hydrogen atoms which react, optionally differently, with isocyanates, and which can act either as chain propagating and/or crosslinking agents, these substances occuring in excess after the stoichiometrical reaction has taken place.

In both cases the excess can amount up to 30%. Suitable compounds of this type include all the other chain propagating agents or crosslinking agents generally employed in polyurethane chemistry, for example diols, e.g. ethyleneglycol, propyleneglycol, butyleneglycols, 1,4-butanediol, butenediol, butindiol, xylyleneglycols, amyleneglycol, 1,4-phenylene-bis-$\beta$-hydroxyethyl ether, 1,3-phenylene-bis-$\beta$-hydroxyethyl ether, bis-(hydroxymethylcyclohexane), hexanediol, and alkanolamines, for example ethanolamine, aminopropyl alcohol, 2,2-dimethylpropanolamine, 3-amino-cyclohexyl alcohol, p-aminobenzyl alcohol, trimethylolpropane, glycerol or N,N,N',N'-tetrakis-(2-hydroxypropyl)ethylenediamine. Of all these substances one preferably uses glycerol. Of course chain lengthening agents and/or crosslinking agents can be used at the same time.

If desired, it is possible to add to the above-described solution containing hydrazines, dihydrazine compounds and/or diamines chain terminating agents and optionally additional gelling agents either besides or instead of the added chainlengthening and/or crosslinking agents. Suitable chain terminating agents include, for example, monohydric alcohols, for example methyl alcohol, ethyl alcohol, propyl alcohol or butyl alcohol, or substances with an amino group such as ethylamine.

The above described solutions containing hydrazines, dihydrazine compounds and/or diamines can have added to them prior to their reaction with the NCO pre-adducts fillers, organic or inorganic pigments, dyestuffs, optical brighteners, ultra violet absorbers, antioxidants and/or additional crosslinking substances, especially substances which effect crosslinkage only after coagulation at elevated temperatures. Sometimes, however, it is more advantageous to add the abovementioned additives to the final polyurethane solution, optionally just before its use for the production of the desired products, rather than to the solution containing the hydrazines, dihydrazine compounds and/or diamines.

Advantageously the dyestuffs, which should be soluble in the solvent used, are added shortly prior to shaping, because a few types of dyestuff can exert an undesirable catalytic action on the NCO pre-adduct. A disadvantage of these dyestuffs is that many of them bleach as a result of the action of light. It is therefore more favorable in certain cases to use the abovementioned pigments. It is true that generally speaking these do not give such bright tones as do the soluble dyestuffs, but they are characterized by a good covering power.

If the pigments are properly chosen, the quantity used can be kept small. There is therefore no fear of the elastic properties of the system being adversely affected afterwards to any appreciable extent.

In the case of carbon black pigments it is even possible, if suitable products are chosen which possess a certain number of OH groups, to incorporate these firmly in the pre-adduct. It should also be pointed out that carbon black pigments are the best stabilisers to hydrolyses of such polyurethane systems.

Pure fillers are available in a large number. Generally speaking it can be said that all non-reactive powdered or fibrous materials whose individual fibre length is below the thickness of the film in case of films can be embedded. In this way one can ensure that thinner coatings than usual will give more uniform surfaces on a substrate material. Of particular interest is the admixture of microporous silicas. However, it is also possible to operate with reactive additives. If one chooses, for example, a substance containing OH groups, e.g. cellulose powder or fibres, it is possible to some extent to incorporate these firmly as fillers.

Suitable solvents for the reaction components include, according to the invention, preferably organic solvents, especially highly polar solvents. Examples for such solvents are aromatic hydrocarbons such as benzene, toluene, xylene, tetraline, decaline, chlorinated hydrocarbons such as methylene chloride, chloroform, trichloroethylene, tetrachloroethane, dichloropropane, chlorobenzene; esters such as ethyl acetate, propyl acetate, butyl acetate, diethyl carbonate; ketones such as acetone, butanone-2, pentanone-2, cyclohexanone; ethers such as furan, tetrahydrofuran, dioxan, anisol, phenetol, dialkoxyethanes and ether-esters of glycol; acid amides such as formamide, dimethylformamide, dimethylacetamide; and sulfoxides such as dimethylsulfoxide. The especially preferably employed solvents include the acid amides, e.g. formamide, dimethylformamide and N,N-dimethylacetamide; sulfoxides, e.g. dimethylformamide and N,N-dimethylacetamide, sulfoxides, e.g. dimethylsulfoxide, dioxane, tetrahydrofuran or mixtures thereof. Although the NCO pre-adducts may be dissolved in a solvent other than hydrazines, dihydrazine coumpounds and/or diamines, the same solvent or solvent mixture is preferably used in the process of the invention for both reaction components.

For the chain propagation and crosslinkage reactions proper both of which take place substantially simultaneously the NCO pre-adduct solution is added to the previously introduced chain propagating/crosslinking agent solution with continuous stirring. The polyurethane formation reaction takes place exothermically and is rapidly terminated. Both the chain propagation and the crosslinkage effect the rise in viscosity. The viscosity abruptly increases rapidly, after an initial slight increase. During this stage of the process the NCO pre-adduct solution must be carefully added to the other component, because after the addition of a certain amount even minutest additions of further NCO pre-adduct effect a high increase in viscosity so that a certain point of the process the reaction solution suddenly gels. According to the invention, it has been surprisingly found that excellently suitable polyurethane solutions are obtained when the addition of NCO pre-adduct is discontinued when the viscosity of the solution has reached such a level. This viscosity level lies between 6,000 and 40,000 cps. in the normally employed systems, i.e., when the reaction solution or the final solution has a honey-like consistency.

In the practical operation of a preferred embodiment of the process of the invention it has further been found that the NCO pre-adduct solution, which preferably has a solids content of 60 to 80% by weight, especially of 70% by weight, and a content of free isocyanate groups of from 1.5 to 5%, is continuously added with stirring to the other component solution containing the hydrazines, dihydrazine compounds and/or diamines at a concentration of 0.02 to 0.05 mole percent, at a rate such that in the instant where rapid increase in viscosity takes place the reaction solution has a solids content between 15 and 35% by weight. As the quantity of the NCO pre-adduct added depends on many factors (temperature, molecular weight of the polyester or polyether used for the production of the pre-adduct, solids content of NCO groups, age of the pre-adduct), it is not possible to calculate this exactly; it is therefore necessary to operate empirically. The safest way is to proceed by determining in a small preliminary test the quantity of pre-adduct approximately required and then, in the actual preparation of the final polyurethane solution, to rely upon the increase in viscosity. In order to produce larger quantities of a useful final solution or reaction solution, it is advisable to use a flow-through gauge which can reproduce the figure found during the preliminary test. However, according to the invention the precision adjustment is then made by means of a built-in viscosimeter. The simplest apparatur recommendet for measuring the viscosity is a falling ball viscosimeter, because the accuracy is sufficient and cleaning is easy, although this instrument can only be used for unpigmented systems. If one wishes to stain the product, this must be done after the viscosity has been adjusted. Another possibility to determine the viscosity is the measurement of the power output of the stirrer motor by means of a suitable ammeter.

According to a special embodiment of the invention, one preferably uses as NCO pre-adduct one which has been obtained by reacting a polyester (produced from adipic acid and hexanediol-1,6) with 4,4'-diphenylmethane diisocyanate in dimethylformamide. This NCO pre-adduct solution is added to a solution of a deficient quantity of hydrazine hydrate in dimethylformamide, to which one has added an excess of glycerol. During the addition and the reaction one maintains the reaction temperature between 20° and 45° C., preferably between 25° and 40° C.

Generally one controls the preparation of the final polyurethane solution in such a way that prior to shaping all the polyurethanes are dissolved in the reaction solution, but after shaping a polymer structure is obtained which is no longer soluble to the extent of more than 50% by weight in cold dimethylformamide and is no longer soluble to the extent of more than 60 percent by weight in boiling dimethylformamide.

The solutions thus obtained are highly viscous, uniformly pregelled, and may be stored for days. When the indicated reaction conditions (temperature, solids content, time and the proper sequence of the individual reaction steps) are observed, a final solution is reproducibly obtained which is within the borderline state between solution and gel and which surprisingly results in the subsequently described elastomeric products. By the selection of suitable raw materials the physical properties can be tailored to a specific end use. The optical properties may be determined during the formation of the polymer structure without any additional processing. The surface is smooth or profiled, depending on the control of the process.

In order to manufacture the elastomeric shaped polyurethane structures, e.g. sheet structures with and without support, panels and other shapes of three-dimensional structures, the final solution prepared in the manner described above is brought into the desired form prior to or after gelling and the solvent is evaporated without allowing it to come to a boil. By the term "boiling" as used herein the evaporation of a liquid with bubble formation is understood, i.e., such that the liquid evaporates also in the interior and not only at its surface. This happens when the vapor pressure has reached the level of the external pressure.

In the process of the invention the evaporation may take place in a vacuum at low, normal or elevated temperatures or under pressure at elevated temperatures. The temperatures and pressures to be employed generally range from 0 to 40 bars, 760 to $10^{-3}$ Torr, and 60° to 180° C. In case pressure is applied, an increase in strength of the final product may be additionally attained.

In the manufacture of films the final solution need not be previously gelled, while it does have to be gelled in the manufacture of thicker sheets or other shaped articles. If desired, gelling may be effected, for example, by storage or by momentary heating and subsequent cooling of the final solution, or by the addition of further crosslinking agents effecting further crosslinkage, e.g. paraformaldehyde. Suitable other gelling agents include, for instance, solvents miscible with the solvent or the solvent mixture of the final reaction solution but constituting a non-solvent for the resulting crosslinked polyurethanes. Such non-solvents include aromatic hydrocarbons such as benzene, toluene, ethylene benzene, xylene, tetraline, decaline; industrial solvent mixtures containing aromatic hydrocarbons such as Sangajol; aliphatic hydrocarbons such as hexane, heptane, octane, nonane, decane and their stereoisomers; petroleum fractions such as petroleum ether, ligroin, white spirits, turpentine substitute, mineral spirits; cycloaliphatic hydrocarbons such as methyl cyclohexane, oil of turpentine; chlorinated hydrocarbons such as chloroform, dichloroethylene, trichloroethylene, hexachloroethane, perchloroethylene, chlorocyclohexane, methylchlorocyclohexane; esters such as methyl acetate, ethyl acetate, propyl acetate, butyl acetate, formic acid esters; ketones, such as acetone, butanone-2, pentanone-2; ethers such as diethyl, dipropyl, dibutyl ether; nitro compounds such as nitromethane, nitrobenzene; alcohols such as tert.butanol; and nitriles such as acetonitrile.

It goes without saying that, according to the systems used, the compounds listed here as non-solvents can also act as solvents and the previously listed solvents can also act as non-solvents, so that it is not possible to avoid some overlapping in the list given above.

When it is desired to produce films the final solution may be applied by doctor knife directly (without previous gelling) onto a suitable substrate and the solvent may be evaporated, as mentioned before. With a wet thickness of 400 microns there is formed a semi-transparent film of about 200 microns thickness in 3 minutes, when the solvent is evaporated at 170° C. The film is so highly crosslinked that it is no longer completely soluble in the former solvent. The films obtained in this way may be after-treated in the conventional way, e.g. by stretching. Moreover, they may be subjected to an after treatment in the heat in order to thus give one-dimentsionally oriented structures which are especially strong in this particular direction.

The high viscosity final solution may also be applied onto porous or non-porous substrates. Examples for porous substrates are knitted, woven, non-woven fabrics, felts and skiver. Non-porous substrates, such as glass sheets, metal strip, fabric or paper sheets provided, if desired, with the negative of a surface embossment or coated with perfluoropolyethylene are used when sheet structures are desired which are to be transferred by conventional transfer methods to porous or non-porous substrates, e.g. adhesion-transferred. According to this method wood, foams, skiver, cardboard, paper and woven or non-woven textile sheet structures may be coated.

For the manufacture of thicker films or sheets and other shaped articles the final solution is cast into a heatable mould one side — or both sides — of which consists of porous sintered steel. Steels of this type have an average pore diameter of 5 to 50 microns. The mould may be constructed such that a vacuum is applied from both sides, or that pressure is applied with a suitable gas from one side, while a vacuum is applied from the other side. In order to impart special properties to these thicker sheets, panels and shaped articles, it is possible, for instance, to carry out additional crosslinkage in the mould. To this end an aldehyde, preferably paraformaldehyde, is added to the elastomer composition which then effects crosslinkage at elevated mould temperature. Moreover, it is possible in the pressure-suction technique to add formaldehyde gas to the incoming pressurized gas which then also has a crosslinking effect.

In another embodiment the additional crosslinking materials are admixed to the final solution which then is allowed to gel. In this mode of operation semi-solid gel structures are obtained from which the solvent is displaced by slight shrinkage by the progressive crosslinkage and the growing insolubility of the composition. These gel structures which can be cut and punched may be subjected to cutting treatment before the solvent is removed in the above described way. The resulting elastomeric articles are also highly crosslinked so that they are largely insoluble in the former solvent.

The following examples explain the invention without constituting a limitation, however. In the examples DMF stands for "dimethylformamide" and MDI denotes "4,4'-diphenylmethane diisocyanate".

EXAMPLE 1

Conditioning of the Polyol (Step 1)

In a stirred reactor equipped with vacuum connection and heating and cooling jacket somewhat more than the calculated amount of polyol is introduced and degassed and dehydrated at 100° C./10 Torr for 30 minutes. Thereafter it is cooled to 50° C. and 0.1% acetyl chloride is added. The mixture is stirred for 30 minutes at that temperature, then heated to 100° C., and a vacuum is applied until no further gas evolves. A sample is taken and the OH and acid numbers are determined in the familiar way. The thus prepared polyol is adjusted with DMF to 70% by weight of solids.

Preparation of the NCO Pre-Adduct with (NCO/OH) = 2.04 (Step 2)

In a dry nitrogen-fillid stirred reactor the calculated amount of MDI is introduced and adjusted to 70% solids by means of DMF. The MDI is rapidly dissolved to form a clear solution with stirring and heating. The polyol of step 1 having a temperature of about 55° C. is added to the MDI solution of 40° C. over a period of 30 minutes. The exothermic heat must be removed at 65 ± 2° C.

The resulting light yellow NCO pre-adduct solution has a residual NCO content of about 3.5%, depending on the molecular weight of the polyol.

Preparation of the Solution ("Final Solution") Containing the Crosslinked Polyurethanes (Step 3)

In a vacuum-tight stirred vessel a solution of 300 parts by weight of DMF, 10 parts by weight of glycerol, 2 parts by weight of hydrazine hydrate is introduced and heated to 30 ± 2° C. The NCO pre-adduct having a temperature of about 40° C. is continously added with stirring such that the viscosity of the final solution rises at first slowly and than with growing rapidity. Ultimately small additions effect an extremely high rise in viscosity. This happens at about 10,000 centipoises. Thereafter the solution is degassed.

Shaping (Step 4)

The solution ("final solution") obtained according to step 3 and containing the crosslinking polyurethanes is spread with a doctor blade on a substrate heated to 80° C. (e.g. a glass sheet) to form a wet film of 1 mm thickness and freed from solvent in a vacuum oven for 5 minutes at 10 Torr. A clear film is formed which has high tear strength and which is no longer completely soluble in the former solvent after removal of the residual solvent.

EXAMPLE 2

Into a dry stirred reactor 2.04 mols MDI in 70% solution in DMF are introduced at 40° C. under a nitrogen atmosphere.

For half an hour one mole of a polyester dissoved in 70% DMF solution and consisting of adipic acid and hexanediol-1,6 with a hydroxyl number of 139.5 is continously added at a reaction temperature of 65 ± 2° C. An NCO pre-adduct solution having an NCO content of 2.5 to 3.0% is obtained which is stable for weeks.

The above described NCO pre-adduct solution is continously added to 3100 parts by weight of DMF and 50 parts by weight of hydrazine hydrate in a stirred reactor equipped with a paddle mixer at 35° C. over a period of 5 minutes until minutest further additions result in an extremely high rise of the viscosity, i.e., a final polyurethane solution of honey-like consistency has been formed. The final about 30% polyurethane solution is processed into a film as described in example 1. A clear film is obtained which has high tear strength and which is no longer completely soluble in the previously used solvent after the residual solvent has been removed.

EXAMPLE 3

An NCO pre-adduct solution prepared as described in example 2 is stirred into a solution of 3,100 parts by weight DMF, 200 parts by weight glycerol and 50 parts by weight hydrazine hydrate until even minutest further additions effect an extremely high increase in viscosity, i.e., until a high viscosity honey-like polyurethane solution has been formed which is processed into a film as described in example 1. A clear film is obtained which has high tear strength and which is no longer completely soluble in the former solvent after removal of the residual solvent.

EXAMPLE 4

A 70% solution of 2.04 mols MDI in DMF is introduced under nitrogen at 40° C. into a dry stirred reactor.

1 Mol of a polyester in 70% DMF solution consisting of adipic acid and equal molar proportions of ethylene glycol and butanediol-1,4 having a hydroxyl number of 56 is continously added over a period of half an hour at a reaction temperature of 65 ± 2° C. There is formed an NCO pre-adduct solution having a residual NCO content of 1.5 to 2.0% which is stable for weeks.

To a solution consisting of 3100 parts by weight of DMF, 90 parts by weight of carbodihydrazide and 100 parts by weight of methanol so much of the prepared NCO pre-adduct solution is stirred until minutest additions result in an extreme rise of the viscosity, i.e., until a high viscosity final polyurethane solution has been formed, which is processed into a film as described in example 1. A clear film is obtained which has high tear strength and which is no longer completely soluble in the former solvent after removal of the residual solvent.

EXAMPLE 5

2.04 Mols MDI in 70% DMF solution are introduced at 40° C. into a dry stirred reactor under nitrogen.

One mol of a polyester in 70% DMF solution which consists of adipic acid and hexanediol-1,6 having a hydroxyl number of 139.5 is continously added over a period of half an hour at a reaction temperature of 65 ± 2° C. There results an NCO pre-adduct solution having a residual NCO content of 3.2% which is stable for weeks.

About 165 parts by weight of the above NCO pre-adduct solution are stirred into a solution of 300 parts by weight of DMF, 7.68 parts by weight of carbodihydrazide, and 10 parts by weight of glycerol until even minutest further additions cause an extreme rise in viscosity, i.e., an high viscosity final polyurethane solution has formed with slight heat effect which remains stable for many days. This final solution is processed into a film, as described in example 1. A clear film of high tear strength is obtained which is no longer completely soluble in the former solvent, after the residual solvent has been removed.

EXAMPLE 6

About 183 parts by weight of an NCO pre-adduct solution (NCO:NH$_2$ > 1) prepared according to example 5 are added to a solution of 300 parts by weight of DMF, 2.5 parts by weight of piperazine, 0.8 parts by weight of hydrazine hydrate, until minutest further additions result in an extremely high rise in viscosity. The resulting final polyurethane solution is processed into a film as described in example 1. A clear film is obtained which exhibits high tear strength and which is no longer completely soluble in the former solvent after removal of the residual solvent.

EXAMPLE 7

59.5 parts by weight of the NCO pre-adduct solution mentioned in example 5 are stirred into a solution of 100 parts by weight of DMF, 2.56 parts by weight of carbodihydrazide, until even minutest further additions produce an extreme rise in viscosity. The resulting final polyurethane solution is processed into a film as described in example 1. A clear film is obtained which has high tear strength and which is no longer completely soluble in the previous solvent, after the residual solvent has been removed.

EXAMPLE 8

10 Percent (based on solids) of a non-reactive pigment and/or dyestuff having a particle size up to 5 microns are dispersed into a final polyurethane solution prepared as described in example 2, and fabricated into a film as described in example 1. A colored film is obtained which has high tear strength and which is no longer completely soluble in the previous solvent after removal of the residual solvent.

EXAMPLE 9

An NCO pre-adduct solution prepared as described in example 2 or 3 is stirred into a solution of 300 parts by weight of DMF, 11.6 parts by weight of 1,4-diaminopiperazine, and 10 parts by weight of glycerol until minutest additions result in an extremely high rise in viscosity. The resulting final polyurethane solution is processed into a film as described in example 1. A clear film is obtained which has high tear strength and which is no longer completely soluble in the previously used solvent, after the residual solvent has been removed.

EXAMPLE 10

A polyurethane solution according to examples 1 to 9 is extruded through an orifice of any desired configuration into a hot air current whereby the solvent evaporates. The resulting products are elastic continuous filaments.

What we claim is:

1. A process for producing crosslinked elastomeric shaped polyurethane structures from crosslinked polyurethanes dissolved in solvents, comprising
   (a) providing an NCO pre-adduct dissolved in a solvent;
   (b) providing a solution of solvent and at least one agent selected from the group of crosslinking agents and chain propagating agents, said at least one agent being selected from the group consisting of hydrazines, hydrazine derivatives, diamines, and polyols, with the proviso that, if only two hydrogen atoms active according to Zerewitinov are present in these agents, an agent must be additionally used which contains at least three hydrogen atoms of different activities according to Zerewitinov;
   (c) continuously admixing the NCO pre-adduct solution into the solution of at least one agent selected from the group consisting of crosslinking agents and chain propagating agents over a period of time during which the viscosity is constantly measured, until the viscosity is within a range where the addition of smaller and smaller amounts of NCO pre-adduct solution results in an ever growing rise in viscosity;

(d) terminating the addition of said pre-adduct solution when the viscosity of the admixture has reached a level at which the addition of even the minutest amount of NCO pre-adduct solution would result in instantaneous gelling, the NCO pre-adduct solution being added in an amount such that the final solution has a solids content between 15 and 35% by weight;

(e) shaping the admixture; and (f) removing said solvent from the shaped mixture.

2. A process according to claim 1 wherein the admixture is shaped prior to gelling.

3. A process according to claim 1 including the further step of gelling the admixture prior to shaping.

4. A process according to claim 1 wherein said NCO pre-adduct solution has a solids content of 60-80% by weight.

5. A process according to claim 4 wherein said NCO pre-adduct solution has a solids content of about 70% by weight.

6. A process according to claim 1 wherein said NCO pre-adduct contains from 1.5 to 5% free isocyanate groups.

7. A process according to claim 1 wherein said at least one agent is selected from the group consisting of hydrazines, dihydrazines, and diamines, said agent being present in said solution in an amount of from 0.02 to 0.05 mole percent.

8. A process according to claim 1 wherein said solvent comprises a highly polar organic solvent.

9. A process according to claim 8 wherein said solvent comprises dimethylformamide.

10. A process according to claim 1 wherein said at least one agent comprises hydrazine dissolved in dimethylformamide.

11. A process according to claim 1 wherein at least one agent comprises hydrazine and wherein the temperature of the admixed solution is maintained at 20°-40° C.

12. a process according to claim 11 wherein said temperature is maintained at 25°-35° C.

13. A process according to claim 7 wherein said at least one agent is used in stoichiometric excess relative to the isocyanate groups present.

14. A process according to claim 7 wherein said at least one agent is selected from the group of hydrazines, hydrazine derivatives, and diamines and is used in stoichiometric deficiency relative to the isocyanate groups present, and at least one further agent selected from the group consisting of chain propagating agents and cross linking agents having at least two active groups with active hydrogen atoms reacting with isocyanates is added to the solution in stoichiometric excess.

15. a process according to claim 1 wherein said solution containing at least one agent selected from the group consisting of crosslinking agents and chain propagating agents contains at least one member selected from the group consisting of agents that effect crosslinking only at elevated temperature, chain terminating agents, gelling agents, fillers, pigments, dyestuffs, optical brighteners, ultraviolet absorbers, and antioxidants.

16. A process according to claim 1 wherein said solvent is removed by evaporation after shaping in a vacuum.

17. A process according to claim 1 wherein said solvent is removed by evaporation under pressure at elevated temperature.

18. A process according to claim 1 wherein said solvent is removed by freeze-drying.

19. A process according to claim 1 wherein said admixture is shaped in a heated mould under pressure and wherein said solvent is removed by suction throughout a sinter plate.

* * * * *